Dec. 13, 1927.
O. O. STORLE
1,652,380
ENGINE VALVE
Filed Jan. 9, 1924
4 Sheets-Sheet 1
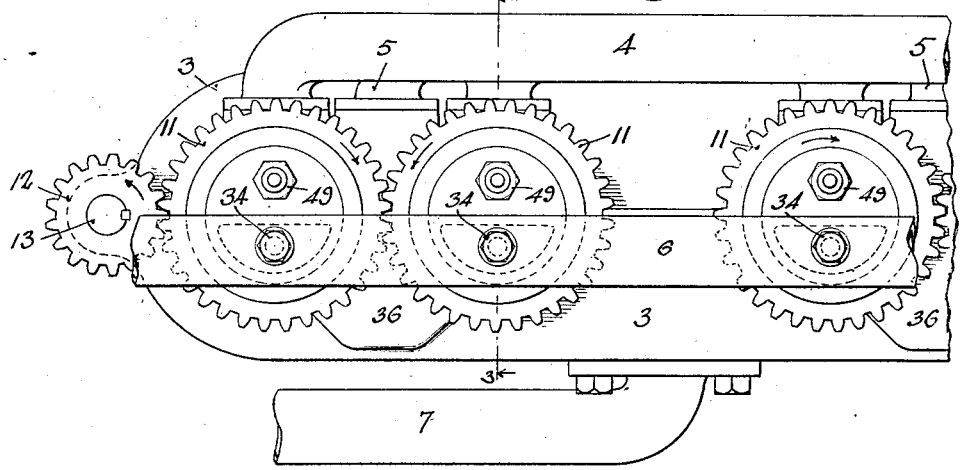
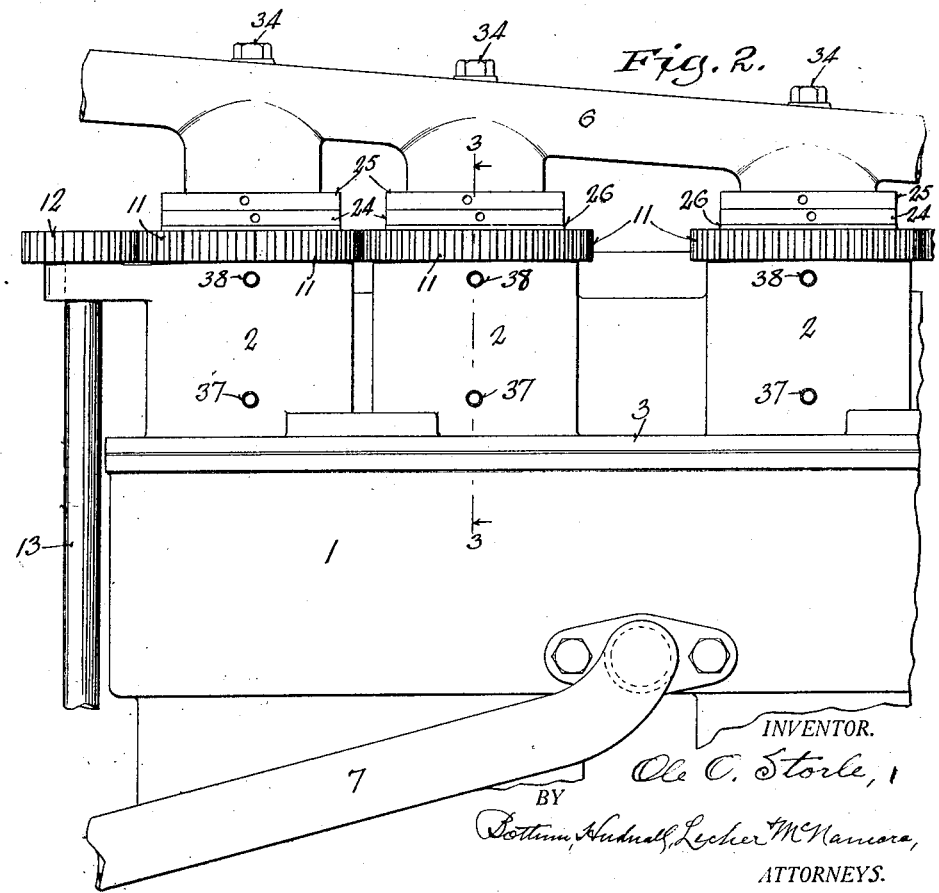
INVENTOR.
Ole O. Storle,
BY
Bottum, Hudnall, Lecher & McNamara,
ATTORNEYS.

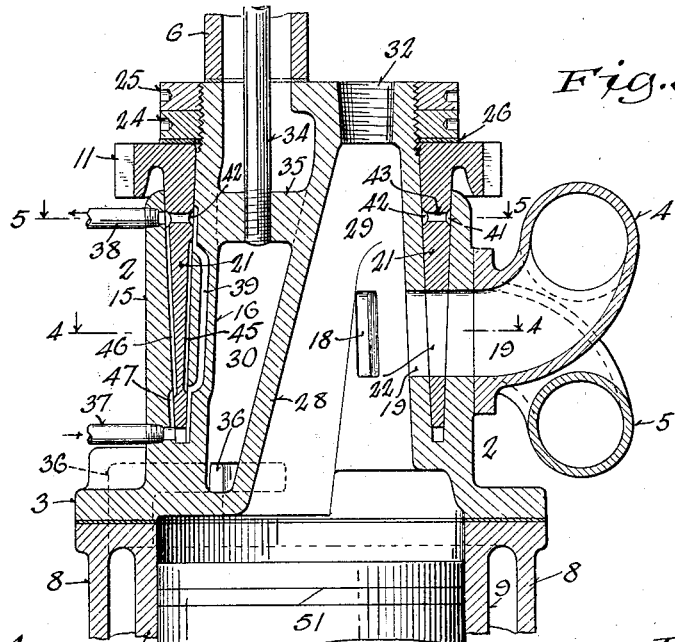
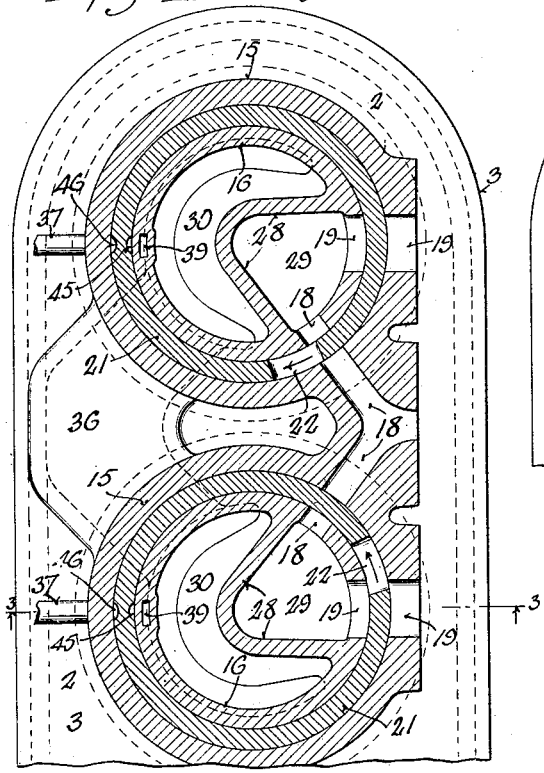
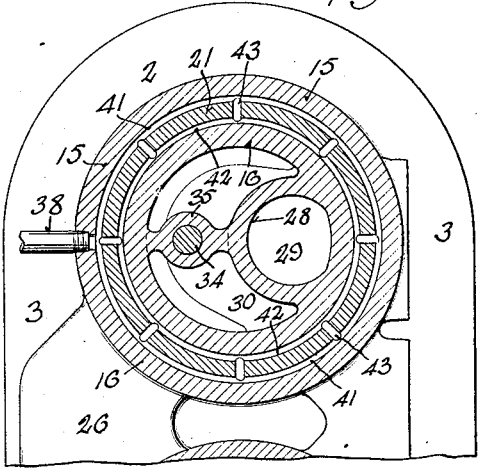

Dec. 13, 1927.

O. O. STORLE

ENGINE VALVE

Filed Jan. 9, 1924

1,652,380

4 Sheets-Sheet 3

INVENTOR:
O. O. Storle,
BY
ATTORNEYS.

Dec. 13, 1927.

O. O. STORLE 1,652,380

ENGINE VALVE

Filed Jan. 9, 1924     4 Sheets-Sheet 4

INVENTOR:
Ole O. Storle
BY
*Pottum, Hudnall, Lecher McNamara,*
ATTORNEYS.

Patented Dec. 13, 1927.

1,652,380

UNITED STATES PATENT OFFICE.

OLE O. STORLE, OF TACOMA, WASHINGTON.

ENGINE VALVE.

Application filed January 9, 1924. Serial No. 685,086.

This invention relates more particularly to rotary valves for internal combustion engines. The main objects of the invention are to avoid noise in the operation of the valve and valve gear; to simplify the construction and reduce the cost of the valve operating mechanism, and make it more durable and less liable to get out of adjustment; to provide for the adjustment of the valve to take up wear or play and to maintain a tight working fit between it and its seats; to prevent the deposit of carbon on the working faces of the valve and its seats; to provide for continuous automatic lubrication and prevent overheating of the valve; and generally to improve the construction and operation of valves of this class.

It consists in the construction, arrangement and combination of parts as hereinafter particularly described and pointed out in the claims.

In the accompanying drawing like characters designate the same parts in the several figures.

Figure 6:
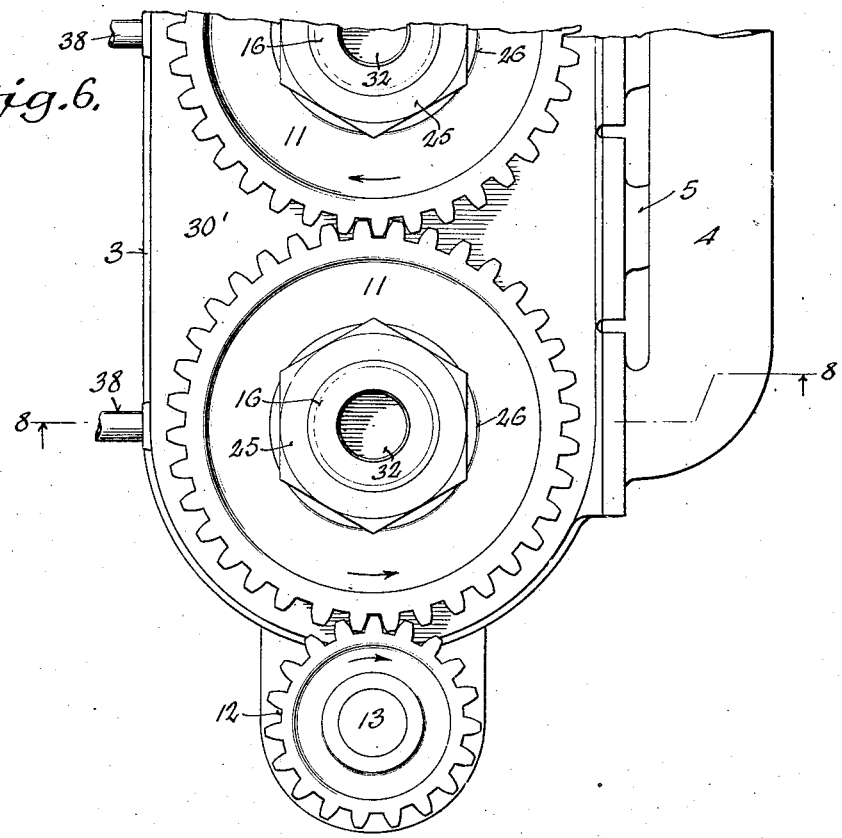
Figure 7:
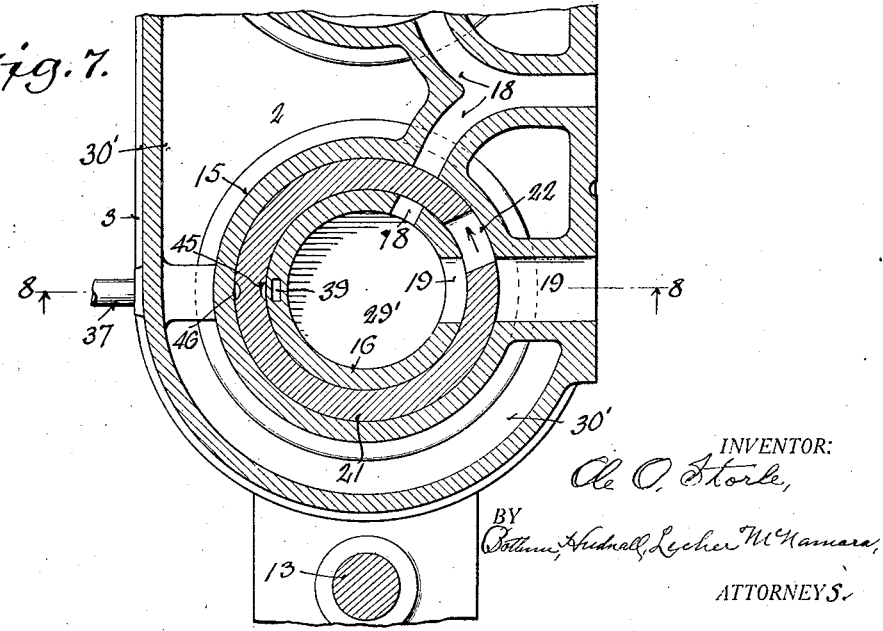
Figure 8:
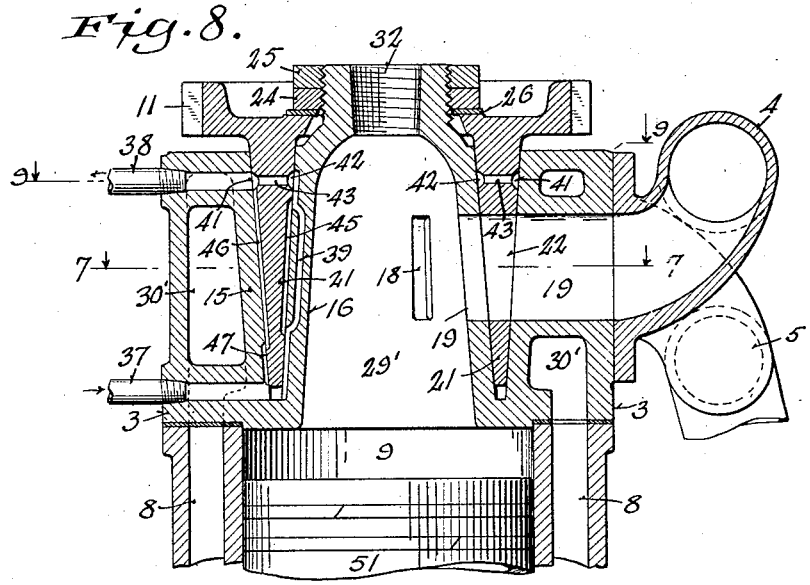
Figure 9:
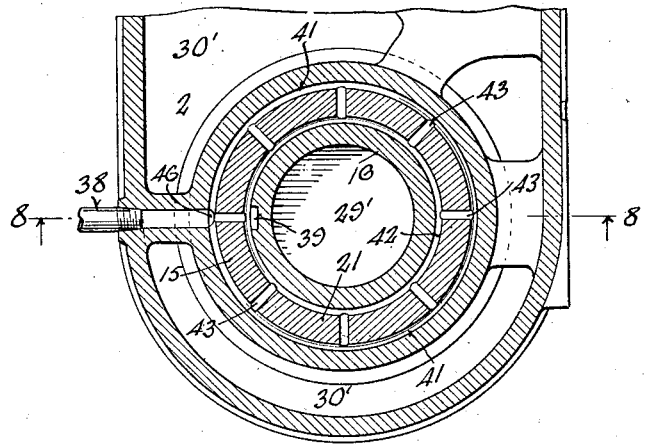

Figure 1 is a plan view of a portion of a multi-cylinder internal combustion engine equipped with valves embodying the invention; Fig. 2 is a side elevation of a portion of the engine; Fig. 3 is an enlarged axial section on the line 3—3, Figs. 1 and 2, of one of the valves and associated parts of the engine; Fig. 4 is a cross section on the line 4—4, Fig. 3, of two of the valves; Fig. 5 is a similar section on the line 5—5, Fig. 3, of one of the valves; Fig. 6 is an enlarged plan view of a portion of a multi-cylinder engine provided with valves of a modified construction; Fig. 7 is a cross section on the line 7—7, Fig. 8; Fig. 8 is an axial section of one of the valves on the line 8—8, Figs. 6, 7 and 9; and Fig. 9 is a cross section on the line 9—9, Fig. 8.

Referring to Figs. 1 to 5 inclusive, 1 designates the cylinder block of a multi-cylinder internal combustion engine such as an automobile engine, 2 designates valve cases. which may be cast as shown, integrally with the upper cylinder head 3, 4 designates the exhaust manifold, and 5 the inlet manifold of the engine, 6 designates a manifold water outlet connection from the valve cases, which communicate with the water jackets of the engine cylinders, to the upper part of the radiator (not shown), and 7 designates the return water connection between the lower part of the radiator and the lower part of the engine block 1, in which water jackets 8 are cast integrally with cylinders 9.

The rotary valve heads with which the engine is equipped, are provided at their upper or outer ends with gears 11, which as shown, are adapted to be driven from the crank shaft of the engine by pinions 12 on shafts 13 connected with the crank shaft by bevel gears (not shown) or otherwise, one of said pinions and shafts being shown for driving a pair of intergeared valves at one end of the engine.

Referring to Figs. 3, 4 and 5, in connection with Figs. 1 and 2, each valve case is formed or provided with outer and inner walls 15 and 16, and an intervening annular valve chamber having reversely inclined conical valve seats converging towards the lower or inner end of the chamber which is closed, the larger outer end of the chamber being open.

The valve case is formed through both walls 15 and 16 and the intervening valve chamber, with inlet or admission ports 18, and outlet or exhaust ports 19, with which the intake manifold 5 and the exhaust manifold 4 communicate respectively.

A rotary annular valve head 21, having reversely tapered or inclined conical faces, is fitted in the valve chamber to the conical seats on the opposing faces of the walls 15 and 16, and is formed with a port 22 adapted to register alternately with the admission and exhaust ports 18 and 19 of the valve case as the valve head is rotated or turned.

The inner wall 16 of the valve case is extended at its upper or outer end and threaded, and is provided with an adjusting nut 24 and a lock nut 25 threaded thereon. The nut 24, with an interposed washer 26 of suitable wearing material, bears against the upper or outer end of the valve head 21 and holds it in place in the valve chamber, affording means for taking up wear and play and maintaining a close working fit between the opposing valve faces and its seats. The gear 11, by which the valve head is rotated or turned, may be formed as shown, integrally with the upper or outer and larger end of the valve head, or may be separately formed and fastened thereto.

The lower or inner end of the valve head terminates short of the lower or inner end of the valve chamber, to allow adjustment of the valve head for taking up wear and play. The space within the inner wall 16 of the valve case is divided by a partition 28, into a combustion or firing chamber 29 and a cooling water chamber 30. The firing chamber 29, which is closed at its upper or outer end and provided with a threaded opening 32 for a spark plug, and is open at its inner or lower end into the adjoining engine cylinder 9, communicates with the inlet and exhaust ports 18 and 19. The cooling chamber 30, which is preferably of greater circumferential extent than the firing chamber 29, is closed at its lower or inner end, and connected at its upper or outer open end with the water header or manifold 6, which is fastened to the several valve cases by bolts 34, each passing through the header or manifold and threaded in a cross piece 35 in chamber 30, as shown in Figs. 3 and 5, gaskets being interposed between the branches of the header or manifold and the valve cases 2. At their inner ends the chambers 30 are connected with the cylinder jackets 8 by passages 36, formed in the base of the valve cases or head 3 of the cylinders.

For continuous and effective lubrication of the valves, each valve case is provided adjacent the lower and upper ends of the valve chambers with oil inlet or supply and outlet connections 37 and 38, communicating through passages or openings in the outer wall 15, with the valve chamber, as shown in Fig. 3.

The inner wall 16 of the valve case is formed with a longitudinal oil channel 39, opening at its ends into the valve chamber and tunneled under the adjacent valve seat to points beyond the path of the port 22 in the valve head, to prevent oil from flowing into said port as it passes said channel on each revolution of the valve head. The lower or inner end of the channel 39 extends below the lower or inner end of the valve head, and opens into the valve chamber in constant communication with the oil supply connection 37.

Annular oil grooves 41 and 42 are formed in the outer and inner faces respectively of the valve head 21, and are connected with each other, as shown in Figs. 3 and 5, by transverse passages or openings 43. The outer groove 41 is located opposite and is in constant communication with the outlet connection 38, and the inner groove 42 is in constant communication with the upper or outer end of the channel 39, so that in whatever position the valve head 21 may be, the inlet connection 37 is in constant communication with the outlet connection 38 through the lower or inner end of the valve chamber, the channel 39, the groove 42, openings 43 and the groove 41. The inner and outer working faces of the valve head 21 are formed respectively each with one or more longitudinal oil grooves 45 and 46. Each groove 45, terminating short of the annular groove 42 and of the lower or inner end of the valve face in which it is formed, is arranged to register at the ends with the open ends of the channel 39 on each revolution of the valve head, and each groove 46 connects at its upper or outer end with the annular groove 41, and at its lower or inner end, which terminates short of the lower or inner end of the valve head, is arranged to register at every revolution of the valve head, with a short blind groove 47 in the valve seat on the inner side of the outer wall 15 leading from the connection 37.

In Fig. 1, spark plugs 49 are shown, and in Fig. 3, a portion of a piston 51 is shown, in the upper end of the cylinder 9.

In the operation of these valves, the valve heads 21 being rotated in the directions indicated by arrows on Fig. 1 by their connections with the crank shaft of the engine through the gears 11 and pinions 12, the port 22 in each valve head is brought into register alternately with the admission and exhaust ports 18 and 19 of the valve case once to each revolution of the valve head and every two revolutions of the crank shaft, if the engine is a four-cycle engine.

In the first quarter revolution of each valve head after passing the exhaust port 19, the port 22 passes the inlet port 18 on the downward or inward suction stroke of the piston 49, and the cylinder is charged with gas or an explosive mixture of oil vapor and air.

During the following quarter revolution and the upward or outward stroke of the piston the charge is compressed, during the next quarter revolution at the beginning of the next downward or inward stroke of the piston, the compressed charge is ignited and exploded by the spark plug 51, extending into the upper or outer end of the firing chamber 29, and during the last quarter revolution at the beginning of the next upward or outward stroke of the piston, the port 22 is brought into register with the exhaust port 19, and the spent gases are discharged from the cylinder and firing chamber through the exhaust manifold 4, according to the usual functioning of a four-cycle internal combustion engine.

With each revolution of the valve head 21, each of the grooves 45 and 46 in its outer and inner faces, is brought into communication with the oil supply connection 37 and filled with oil, which is carried around with the valve head and distributed over its conical faces and seats, keeping them thoroughly lubricated.

While the engine is working, water circulated through and cooled in the radiator in the usual manner, passes through the connection 7 into and through the water jackets 8 of the cylinders and thence through the passages 36 into the chambers 30, where it comes in contact with extended areas of the inner walls 16 of the valve cases, thereby preventing the overheating of the valves and burning or detrimentally affecting the oil with which they are lubricated. From the chambers 30 the heated or warmed water returns through the header or manifold connection 6 to the radiator to be re-cooled.

The conical working faces of the valve heads 21 turning on their conical valve seats, tend to maintain a tight or close working fit therewith, prevent the deposit of carbon thereon, and cause the valve heads to operate easily, smoothly and noiselessly.

Referring to Figs. 6 to 9 inclusive, showing valves of a modified construction, the outer walls 15 of the valve cases are surrounded by a water jacket 30', which may be cast integrally therewith and communicates with the water jacket 8 of the engine cylinders 9. The combustion or firing chambers 29' occupy the entire space within the inner walls 16 of the case. In other respects the construction and operation of these valves are essentially like those of the valves shown by Figs. 1 to 5 inclusive.

Various modifications other than those specifically shown and mentioned, may be made in the details of construction and arrangement of parts of the valves, without departure from the principle and scope of the invention as defined in the following claims.

I claim:

1. In combination with a cylinder of an internal combustion engine, of a valve case secured thereto and comprising an outer wall and an inner wall extending beyond said outer wall, a partition separating said valve case into a combustion chamber and a water cooling chamber, inlet and outlet passages for said water cooling chamber, an annular valve provided at the upper end thereof with a gear and fitted between said outer and inner walls for rotation with respect thereto, and a nut threaded upon the extended portion of said inner wall and directly engaging and holding said valve in operative position between said inner and outer walls, said walls being provided with registering inlet and outlet ports for said combustion chamber, said valve being adapted to open and close said ports upon rotary movement thereof.

2. In combination with a cylinder provided with a water jacket, of a valve case secured thereto and comprising an outer wall and an inner wall extending beyond said outer wall, a partition separating said valve case into a combustion chamber and a water cooling chamber, a passage connecting the lower end of said water cooling chamber to said water jacket, an outlet connection for said water cooling chamber secured to said valve case, an annular valve provided at the upper end thereof with a gear and fitted between said outer and inner walls for rotation with respect thereto, and a nut threaded upon the extended portion of said inner wall and directly engaging and holding said valve in operative position between said inner and outer walls, said walls being provided with registering inlet and outlet ports for said combustion chamber, said valve being adapted to open and close said ports upon rotary movement thereof.

3. In combination with a plurality of cylinders provided with water jackets, of valve cases secured to said cylinders and comprising outer walls and inner walls extending beyond said outer walls, partitions separating said valve cases into combustion chambers and water cooling chambers, passages connecting the lower ends of said water cooling chambers to said water jackets, a water manifold secured to said valve cases and providing outlet passages for said water cooling chambers at the upper ends thereof, annular valves provided at the upper ends thereof with gears and fitted between said outer and inner walls for rotation with respect thereto, means for driving said gears, and nuts threaded upon the extended portions of said inner walls and directly engaging and holding said valves in their respective operative positions between said inner and outer walls, said walls being provided with registering inlet and outlet ports for said combustion chambers, said valves being adapted to open and close said ports upon rotation thereof by said means.

4. In an internal combustion engine, a cylinder provided with a valve casing having a combustion chamber communicating with said cylinder and comprising outer and inner spaced walls, said inner wall extending beyond said outer wall and varying in cross-section at a uniform rate from the lower end thereof to the extended end of the same, an annular valve member fitted between said walls and provided at its upper end with gear teeth extending outwardly over the upper end of said outer wall, the inner annular face of said valve member varying in cross-section at a uniform rate from end-to-end thereof and contacting throughout its entire length with the adjacent face of said inner wall, the extended end of said inner wall being threaded to substantially the upper end of said valve member, and a nut threaded upon said threaded portion of the extended end of said inner wall and directly bearing upon the upper end of said valve member to hold the latter in operative position between said walls, said walls and said valve member being provided with ports arranged to register upon rotary movement of said member to provide inlet and exhaust ports for said cylinder.

5. In an engine valve the combination of a valve case having inner and outer walls forming an annular valve chamber closed at the inner end and open at the outer end and having reversely inclined coaxial conical valve seats, a firing chamber within the inner wall open at its inner end for communication with an engine cylinder, and inlet and exhaust ports through both walls to the firing chamber; a rotary annular valve head fitted in the valve chamber to said seats and having a driving gear at its outer end and a port arranged to register alternately with the inlet and exhaust ports of the case, and adjusting and lock nuts threaded on an outward extension of the inner wall of the case next to the outer end of the valve head.

6. In an engine valve the combination of a valve case having inner and outer walls forming an annular valve chamber with coaxial valve seats and a firing chamber within the inner wall and having inlet and exhaust ports through both walls; a rotary annular valve head fitted in the valve chamber to said seats and having a port arranged to register alternately with the inlet and exhaust ports of the case, the valve head being provided with longitudinal oil grooves in its inner and outer working faces, and oil supply and outlet connections with the case adapted to register with and replenish the oil grooves in the valve head at each revolution thereof.

7. In an engine valve the combination of a case having inner and outer walls, forming an annular valve chamber with coaxial valve seats on opposite sides thereof and a firing chamber within the inner wall and having inlet and exhaust ports through both walls and the intervening valve chamber to the firing chamber, oil supply and outlet connections adjacent the ends of the valve chamber, and a longitudinal oil channel in constant communication with said oil supply and outlet connections and tunneled under the adjacent valve seat to points beyond the path of the port in the valve head; and a rotary annular valve head fitted in the valve chamber to the seats on opposite sides thereof and having a port arranged to register alternately with the inlet and exhaust ports of the case and connected annular and longitudinal oil grooves in its inner and outer working faces, one longitudinal oil groove being connected at one end with the annular groove in the same face of the valve head and arranged to register at the other end with the oil supply connection of the case and the other longitudinal groove being arranged to register at its ends with the tunneled channel in the case on each revolution of the valve head.

8. In an internal combustion engine, a cylinder provided with a valve casing having a combustion chamber communicating with said cylinder and comprising an outer wall and an inner wall spaced therefrom and rigidly connected therewith, the upper end of said inner wall being threaded and extending upwardly beyond the upper end of said outer wall, an annular valve fitted loosely between said walls for rotary movement with respect thereto, the upper end of said valve extending upwardly beyond the upper end of said outer wall and being provided with a gear rigidly connected therewith and extending outwardly over the latter, and a nut threaded upon said extended end of said inner wall and arranged to bear directly and downwardly upon the upper end of said valve whereby the latter is held in operative position between said walls, said walls and said valve being provided with ports arranged to register upon rotary movement of said valve to provide inlet and exhaust ports for said cylinder.

9. In an internal combustion engine, a cylinder provided with a valve casing having a combustion chamber communicating with said cylinder and comprising an outer wall and an inner wall spaced therefrom, the upper end of said inner wall being threaded and extending upwardly beyond the upper end of said outer wall, an annular valve fitted loosely between said walls for rotary movement with respect thereto, the upper end of said valve extending upwardly beyond the upper end of said outer wall and being provided with a gear extending outwardly over the latter, and a nut threaded upon said extended end of said inner wall and arranged to bear directly and downwardly upon the upper end of said valve whereby the latter is held in operative position between said walls, said walls and said valve being provided with ports arranged to register upon rotary movement of said valve to provide inlet and exhaust ports for said cylinder, said upwardly extended end of said inner wall being adapted to receive and support a spark plug in operative relation with respect to said combustion chamber.

10. In an internal combustion engine, a cylinder provided with a valve casing having inner and outer walls and a partition separating said casing into a combustion chamber communicating with said cylinder and a water-cooling chamber, the upper ends of said partition and said inner wall providing an opening for receiving a spark plug, a valve loosely fitted between said walls for movement with respect thereto, said walls and said valve being provided with ports arranged to register upon movement of said valve to provide inlet and outlet ports for said cylinder, and means for moving said valve.

11. In an internal combustion engine, a cylinder provided with a valve casing having a partition separating the latter into a combustion chamber communicating with said cylinder and a water-cooling chamber extending from the lower end of said casing upwardly to the upper end of the latter and being provided with a cross piece, a water manifold fitted over and communicating with the upper end of said water-cooling chamber, a bolt passing through said manifold and being threaded into said cross piece whereby the former is held in assembled relation with respect to said water-cooling chamber, a valve associated with said casing, said valve and said casing being provided with openings arranged to register upon actuation of said valve to provide inlet and outlet ports for said cylinder, and means for actuating said valve.

12. In an engine valve, a casing having inner and outer walls spaced to form a valve chamber and a combustion chamber within said inner wall, an annular valve loosely fitted between said walls for rotary movement with respect thereto, said walls and said valve being provided with openings arranged to register upon rotary movement of said valve to provide inlet and outlet ports for said combustion chamber, means for rotating said valve, an oil supply passage communicating with the lower end of said valve chamber at a point below the lower end of said valve, an oil outlet passage communicating with the upper end of said valve chamber, said valve being provided with a groove on each side thereof having their respective ends arranged to communicate with said inlet and outlet passages during each revolution of said valve whereby oil is caused to flow around the lower end of the latter and thence upwardly along said grooves between said valve and said walls and out through said outlet passage.

13. In an engine valve, a casing having inner and outer walls spaced to form a valve chamber and a combustion chamber within said inner wall, an annular valve loosely fitted between said walls for rotary movement with respect thereto, said walls and said valve being provided with openings arranged to register upon rotary movement of said valve to provide inlet and outlet ports for said combustion chamber, means for rotating said valve, an oil chamber formed in one of said walls and having its respective ends communicating with the adjacent face of said valve at points beyond the opening in said valve, an oil supply passage communicating with one end of said oil chamber, and an oil outlet passage communicating with the other end of said oil chamber, said face of said valve being provided with a groove arranged to communicate with the respective ends of said oil chamber during each revolution of said valve whereby oil is caused to flow along said groove between said wall and said face of said valve.

14. In an engine valve, a casing having inner and outer walls spaced to form a valve chamber and a combustion chamber within said inner wall, an annular valve loosely fitted between said walls for rotary movement with respect thereto, said walls and said valve being provided with openings arranged to register upon rotary movement of said valve to provide inlet and outlet ports for said combustion chamber, means for rotating said valve, said valve being provided on each side thereof with grooves extending from the lower end of said valve to the upper end thereof, a passage through said valve connecting the upper ends of said grooves, and an oil supply passage arranged to communicate with the lower ends of said grooves and an oil outlet passage arranged to communicate with the upper ends of said grooves during each revolution of said valve whereby oil is caused to flow upwardly along said grooves on each side of said valve and out through said outlet passage.

15. In an engine valve, a casing having inner and outer walls spaced to form a valve chamber and a combustion chamber within said inner wall, an annular valve loosely fitted between said walls for rotary movement with respect thereto, said walls and said valve being provided with openings arranged to register upon rotary movement of said valve to provide inlet and outlet ports for said combustion chamber, means for rotating said valve, outer and inner annular oil grooves formed respectively in the outer and inner faces of said valve at the upper end thereof, a passage in said valve connecting said annular grooves, a groove formed in the outer face of said valve and communicating with said outer annular oil groove, a groove formed in the inner face of said valve, said inner wall being provided with an oil chamber in constant communication with said inner annular oil groove and arranged to connect the latter to the groove in the inner face of said valve during each revolution of the latter, an oil supply passage arranged to communicate with said grooves in the outer and inner faces of said valve during each revolution of the latter, said oil supply passage being in constant communication with said oil chamber, and an oil outlet passage in constant communication with said outer annular oil groove whereby in any position of said valve said oil supply passage will be in constant communication with said oil outlet passage.

16. In an engine valve, a casing having inner and outer walls spaced to form a valve chamber and a combustion chamber within said inner wall, an annular valve loosely fitted between said walls for rotary movement with respect thereto, said walls and said valve being provided with openings arranged to register upon rotary movement of said valve to provide inlet and outlet ports for said combustion chamber, means for rotating said valve, and an oil supply passage and an oil outlet passage communicating with said valve chamber, the inner and outer faces of said valve and the respective adjacent faces of said inner and outer walls being provided with communicating grooves and passages arranged to maintain constant communication between said oil supply and outlet passages and to permit oil to flow from said oil supply passage along the grooves in said inner and outer faces of said valve and toward said oil outlet passage during each revolution of said valve.

17. In an internal combustion engine, a cylinder provided with a valve casing having inner and outer walls rigidly connected to each other and angled to provide a tapering valve chamber, a valve loosely fitted between said walls for movement with respect thereto, means adjustably and positively connected to the inner wall and directly and positively engaging the valve to hold the valve in proper adjustment, said valve and said walls having cooperating ports.

In testimony whereof I hereto affix my signature.

OLE O. STORLE.